J. E. CHAPIN.
Pipe and Hose Coupling.

No. 221,153.   Patented Nov. 4, 1879.

Witnesses:
Carl Karp
Otto Risch.

Inventor:
John E. Chapin
by Paul Goepel.
Attorney.

UNITED STATES PATENT OFFICE.

JOHN E. CHAPIN, OF NEW YORK, N. Y.

IMPROVEMENT IN PIPE AND HOSE COUPLINGS.

Specification forming part of Letters Patent No. 221,153, dated November 4, 1879; application filed April 12, 1879.

*To all whom it may concern:*

Be it known that I, JOHN E. CHAPIN, of the city, county, and State of New York, have invented certain new and useful Improvements in Pipe and Hose Couplings, of which the following is a specification.

Figure 1:
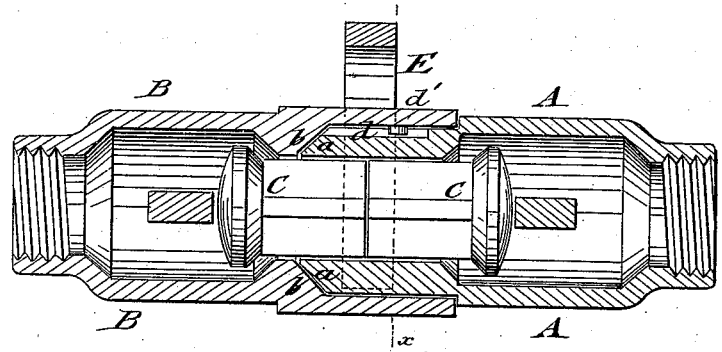
Figure 2:
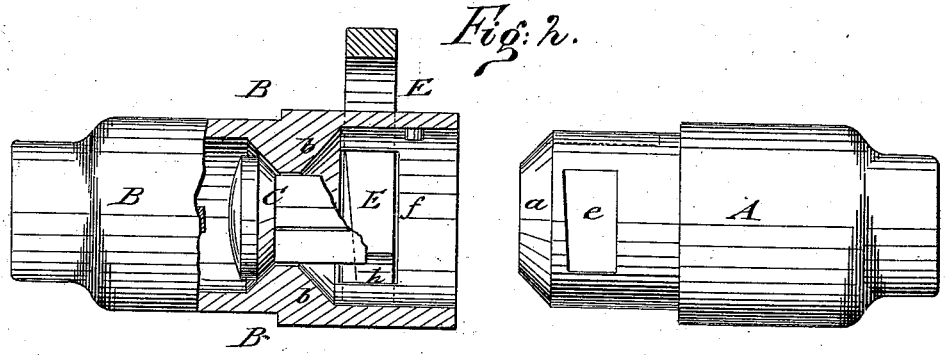
Figure 3:
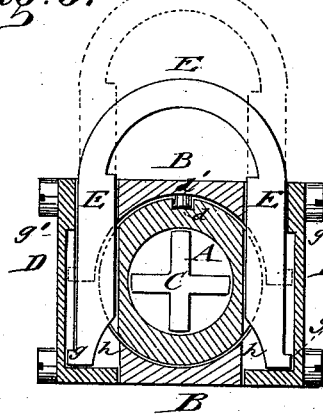

In the accompanying drawings, Figure 1 represents a vertical longitudinal section of my improved hose and pipe coupling. Fig. 2 shows a vertical longitudinal section of the female part, and a side view of the male portion; and Fig. 3 is a vertical transverse section of the coupling on line $x\, x$, Fig. 1.

Similar letters of reference indicate corresponding parts.

This invention has for its object to furnish for steam-heating pipes, fire-hose, and other purposes a simple and reliable coupling, by which a perfectly-tight joint is obtained without the use of any packing, and the connection or disconnection of the male and female portions accomplished in a quick, easy, and reliable manner.

The invention consists of the male portion of the coupling having a conically-tapering end and parallel recesses at diametrically-opposite points, in connection with a female portion having a corresponding seat and side recesses and openings. A U-shaped locking-key that enters the recesses of the male and female portions is guided and retained by side caps of the female portion. The recesses of the male portion, as well as the key, are slightly inclined at the sides toward the seat, so that by coupling the parts and pushing down the key the conical end of the male portion is tightly forced to the seat of the female portion.

Referring to the drawings, A represents the male and B the female portion of my improved coupling for hose and pipes of all kinds. Both parts are arranged with interior seats and valves C, when the coupling is used for connecting steam-pipes of cars, &c., while for fire-hose and other purposes the valves may be dispensed with. These valves are opened automatically on coupling the male and female portions, as shown in Fig. 1. As soon as the coupling is disconnected the valve of that portion connected with the source of steam is closed automatically by the internal steam-pressure in the well-known manner in such couplings.

The front end of the male portion A is made of conically-tapering shape, as shown at $a$, and fits intimately into a seat, $b$, of corresponding shape at the interior of the female portion B. The male coupling is guided to its proper position in the female portion by a longitudinal groove, $d$, and fixed pin or stud $d'$. The male portion A is further provided at diametrically-opposite points with recesses $e$, that are parallel to each other. These recesses are inclined at that side nearest to the conical end, the inclination being backwardly or off the conical end. The female portion B is also provided at opposite points with parallel recesses and openings $f$, and with exterior side caps D, that are screwed to the female portion, and form, with the recesses, interior chambers for guiding a U-shaped key, E. The upper semicircular portion of the key forms the handle, by which the key may be raised or lowered in the guide-recesses of the female portions and side caps. Outwardly-projecting shoulders $g$ at both ends of the key interlock with interior shoulders $g'$ at the upper parts of the side caps, so as to prevent the withdrawal and loss of the key. The key is also recessed at the inside of the ends at $h$, the recesses being cut at an arc of a circle whose diameter is equal to the inner diameter of the female portion. The shoulders of the key and of the side caps admit the raising of the key to such height that the arc-shaped recesses form a part of the inner circumference of the female portion, and clear thereby the way for the insertion of the male portion. When the male portion is inside of the female portion the key is pushed down, so as to engage the side recesses of the male portion. The legs of the key E facing the seat $a'$ are cut off at the same inclination as the sides of the recesses of the male portion, so that the wedge action of the key on the inclined sides of the recesses $a$ forces the male portion tightly on its seat in the female portion, and produces thus an intimate joint between the same.

By raising the key the coupling is instantly disconnected, and thus a cheap, reliable, and effective coupling for all kinds of pipes and hose obtained without the use of any packing whatever.

Having thus described my invention, I claim as new and desire to secure by Letters Patent—

1. In hose and pipe couplings, the combination of the male portion, having a conical end and parallel recesses at diametrically-opposite points, with a female coupling, having an interior conical seat and side openings, and a guided and U-shaped locking-key, substantially as set forth.

2. The combination of the male portion, having parallel recesses at opposite sides, said recesses having inclined front sides, with a female portion, having side guide-caps, and with a U-shaped key whose legs have a corresponding inclination at one side, so as to cause the intimate locking of the portions, substantially as set forth.

3. The female portion, having side recesses and openings, and side guide-caps with interior shoulders, combined with a U-shaped locking-key, having projections or shoulders at the lower ends, substantially as specified.

4. In hose and pipe couplings, a U-shaped locking-key, E, having arc-shaped recesses $h$ at the inside of the ends, substantially as specified.

In testimony that I claim the foregoing as my invention I have signed my name, in presence of two witnesses, this 5th day of April, 1879.

JOHN E. CHAPIN.

Witnesses:
PAUL GOEPEL,
ADOLF DENGLER.